United States Patent [19]

Tsurumi et al.

[11] Patent Number: 5,275,999
[45] Date of Patent: Jan. 4, 1994

[54] PROCESS OF PREPARING CATALYST SUPPORTING HIGHLY DISPERSED METAL PARTICLES

[75] Inventors: Kazunori Tsurumi; Haruko Sugimoto; Nobuo Yamamoto; Toshihide Nakamura, all of Kanagawa, Japan; Paul Stonehart, Madison, Conn.

[73] Assignees: Tanaka Kikinzoku Kogyo K.K., Tokyo, Japan; Stonehart Associates, Inc., Madison, Conn.

[21] Appl. No.: 985,207

[22] Filed: Dec. 3, 1992

[30] Foreign Application Priority Data

Dec. 4, 1991 [JP] Japan .................. 3-348729

[51] Int. Cl.$^5$ .................. B01J 23/42; B01J 23/44; B01J 23/46
[52] U.S. Cl. .................. 502/339; 502/325
[58] Field of Search ............ 502/185, 325, 333, 334, 502/339

[56] References Cited

U.S. PATENT DOCUMENTS 4,059,541 11/1977 Petrow et al. .............. 50/339 X
4,956,331 9/1990 Tsurumi et al. ............ 502/185 X Primary Examiner—W. J. Shine
Attorney, Agent, or Firm—Sughrue, Mion, Zinn, Macpeak & Seas

[57] ABSTRACT

Disclosed is a process of preparing a catalyst supporting highly metal particles comprising, in the presence of carbon monoxide in a solution containing a metal-containing ion and a support on which metal particles produced by reduction of the metal-containing ion are supported, reducing by means of a reductant the metal-containing ion to the corresponding metal particles which are then supported on the support. According to the process of the present invention, because of the presence of the carbon monoxide which is supposed to have a function of depressing the deposition of a new metal particle present around the metal particles supported on the support, that is, the growth of the metal particles and another function of preventing the agglomeration among the metal particles supported, the catalyst of excellent properties having the metal particles supported and monodispersed on the support with the narrow particle size distribution can be prepared of which an average particle size is not more than 20 Å. After the preparation of the catalyst, the carbon monoxide can be easily taken out from the system so that no harmful effects are produced by the employment of the carbon monoxide.

3 Claims, 6 Drawing Sheets

Particle Size Distribution
Average Particle Size: 17Å

PROCESS OF PREPARING CATALYST SUPPORTING HIGHLY DISPERSED METAL PARTICLES

BACKGROUND OF THE INVENTION

The present invention relates to a process of preparing a catalyst supporting highly dispersed metal particles utilized in the field of catalyst.

While support-type metal catalysts have been widely employed in various chemical reactions, it is required to reduce the particle diameter of the metal particles as much as possible for uniformly supporting the metal particles on a support in order to effectively utilize the catalytically active metals especially when such an expensive catalyst metal as a precious metal is employed. In order to attain this requirement, many attempts have been made to support a metal of fine particles on a support.

Heretofore, a metal ion in a solution has been reduced by means of a reductant to its metallic state to form metal particles. In general, in order to obtain the metal fine particles, the reduction is proposed to be carried out under the conditions that many nuclei are made to be formed of which subsequent growth is depressed. However, in practice, the metal particles once generated are likely to agglomerate with the increase of their particle size. It is quite difficult to produce metal particles of monodispersion having narrow particle size distribution of which particle size is not more than 30 Å. Moreover, the amount of the metal particles capable of supporting on the support in the monodispersion state is restricted depending on the surface area of the support on which the metal particles are supported. It is difficult to support the metal particles on a support having a low specific surface area in the monodispersion state which invites more excellent catalytic effects.

Although, in order to overcome these problems, the metal particles are obtained by adding a polymer surfactant or such a substance as sulfur colloid as protective colloid to a solution containing a metal-containing ion to reduce the said metal containing ion, this process possesses the following disadvantages. (1) The lower limit of the metal particles is about 30 Å, (2) the degree of monodispersion on the support is poor, and (3) the metal particles produced are difficult to be separated from the remaining protective colloid, and during the washing to remove the colloid, the particles are likely to agglomerate with each other to widen the particle size distribution range.

SUMMARY OF THE INVENTION

The present invention has been made to overcome the above-mentioned problems.

An object of the present invention is to provide a process of preparing a catalyst of which a particle size is less than that of a conventional catalyst.

Another object of the invention is to provide a process of preparing a catalyst which supports metal particles of monodispersion.

A further object of the invention is to provide a process of preparing a catalyst having narrow particle size distribution.

The present invention has been made to overcome the above problems, and is a process of preparing a catalyst supporting highly dispersed metal particles comprising, in the presence of carbon monoxide in a solution containing a metal-containing ion and a support on which metal particles produced by reduction of the metal-containing ion are supported, reducing by means of a reductant the metal-containing ion to the corresponding metal particles which are then supported on the support.

According to the process, because of the presence of the carbon monoxide which is supposed to have a function of depressing the deposition of new metal particles present around the metal particles supported on the support, that is, the growth of the metal particles and another function of preventing the agglomeration among the metal particles supported, the catalyst of excellent properties having the metal particles supported and monodispersed on the support with the narrow particle size distribution can be prepared of which an average particle size may be not more than 20 Å. After the preparation of the catalyst, the carbon monoxide can be easily taken out from the system so that no harmful effects may be produced by the employment of the carbon monoxide.

The process of the invention is especially useful when applied to the preparation of the catalyst supported with such a precious metal as palladium, rhodium, ruthenium, iridium and platinum, and the invention enables the further elevation of the activities of the catalytically active precious metal catalyst.

A variety of reductants may be employed in the present invention such as hydrazine hydrochloride, hydrazine sulfate, sodium borohydride, ethanol, methanol, hydrazine hydrate and L-ascorbic acid. Even if a strong reductant is employed, the catalyst supporting the metal particles highly dispersed can be obtained.

DETAILED DESCRIPTION OF THE INVENTION

Figure 1:
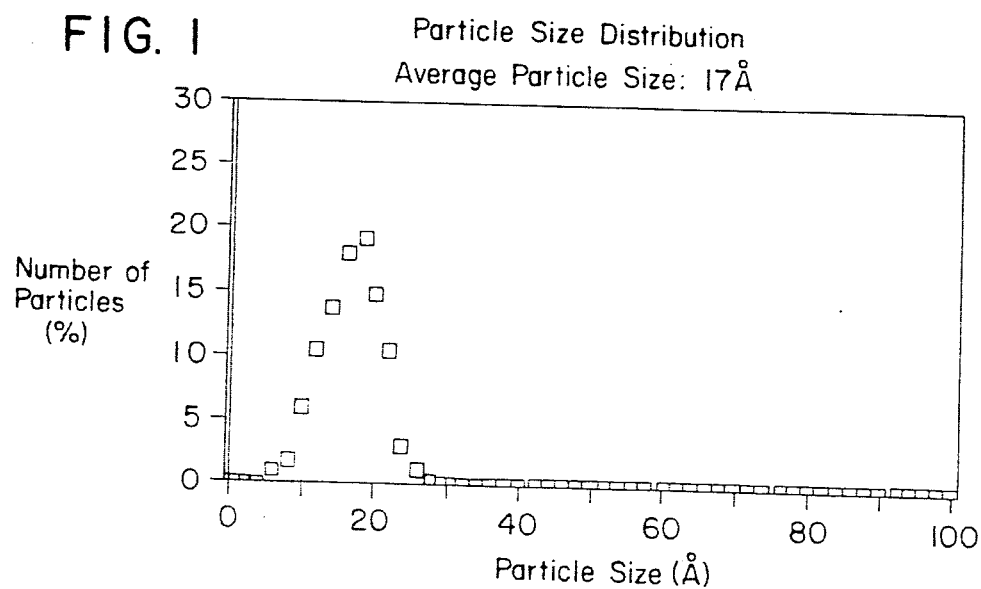
FIG. 1 is a graph showing the particle size distribution of the carbon catalyst supporting the platinum obtained in Example 1.

Although an ion containing a metal ordinarily employed as a catalyst metal may be employed without limitation as a metal-containing ion of the present invention, it is preferable to employ an ion containing such a catalytically active metal as palladium, rhodium, ruthenium, iridium and platinum, that is, a single metal ion and a metal complex ion composed of a central metal and other ligands coordinating the central metal.

Although a reductant reducing the said metal-containing ion is not especially restricted as long as it does not react with carbon monoxide to lower its reduction efficiency, it is preferable to employ one or more reductants selected from the group consisting of hydrazine hydrochloride, hydrazine sulfate, sodium borohydride, ethanol, methanol, hydrazine hydrate and L-ascorbic acid.

The support employed is not especially restricted and such a conventional inorganic oxide support as silica and alumina, and a carbon support and the like may be employed without limitation.

In order to support the metal to the support employing these respective components, the support may be suspended in the solution, ordinarily the aqueous solution dissolving the metal-containing ion followed by reduction of the metal-containing ion to the corresponding metal by means of the reductant under the conditions that carbon monoxide may be always in contact with the support to support the metal thereon with the high dispersion state.

The reduction conditions may be the same as those for the conventional reduction employing no carbon monoxide. For instance, the reduction of the above metal-containing ion may be conducted under the conditions of 5° to 60° C., preferably 25° to 45° C. of the solution temperature and 1.0 to 2.0 molar equivalence of the reductant to an amount of the metal to be supported.

The catalyst supporting the metal particles of monodispersion with uniform particle size less than about 20 Å can be obtained according to the above process which has not been obtained in a conventional process. The effects the carbon monoxide exhibits in the formation of the metal particles is supposed to be accounted for the inhibition of the agglomeration among the metal particles by mean of the carbon monoxide which adsorbs and covers the surface of the metal particles to prevent the growth of the said metal particle nuclei by the deposition of a new metal atom on the surface of the metal nuclei.

The supply of the carbon monoxide into the solution in the present invention is desirably conducted by means of bubbling, and as mentioned earlier the supply speed thereof is so adjusted that the carbon monoxide always exists on the support.

Although most of the carbon monoxide employed escapes from the solution into air, part of the carbon monoxide remains on the metal particles in the state of adsorption. The carbon monoxide may be liberated from the metal surface and removed, after the filtration and the washing of the catalyst supporting the metal particles, by drying the catalyst at a temperature of not more than 100° C. in a reduction atmosphere. During the removing procedure, no growth of the metal particle size occurs.

In the present invention, the degree of fineness of the supported metal can be increased even when such a strong reductant as the hydrazine and the sodium borohydride is employed, and the catalyst supported with the finer and more uniform catalyst metal than that of a conventional catalyst can be prepared.

EXAMPLES

Although Examples of the present invention will be described, it is not intended to restrict the scope of the present invention.

Example 1

To an aqueous solution which had been prepared by diluting 12.5 ml of an aqueous solution of chloroplatinic acid (platinum concentration was 200 g/liter) with 1 liter of pure water, 10 g of carbon powder was added and sufficiently dispersed by means of an ultrasonic homogenizer. While carbon monoxide was blown into the solution at the rate of 100 ml/min., the platinum ion was reduced by adding a solution which had been prepared by dissolving 0.88 g of hydrazine hydrate into 100 ml of pure water, followed by the stirring for 16 hours.

Figure 2:
FIG. 2 is a microphotograph of 1,000,000 times of the carbon catalyst supporting the platinum obtained in Example 1.

After the suspended solution containing the support was filtered and washing with 3 liter of pure water was repeated until the pH of the filtrate became 7, the support was dried. The amount of the supported platinum of the platinum-supported carbon support obtained was 20% in weight. The particle size and the particle size distribution of the metal particles of this catalyst were measured by means of X-ray diffraction, and the catalyst was observed by means of an electron microscope. The particle size distribution and a microphotograph of 1,000,000 times are shown in FIGS. 1 and 2, respectively. The graph of FIG. 1 showing the particle size distribution has been prepared by dividing the range of the particle size measured into ranges of every 2 Å and plotting the respective percentages of the particle number belonging to the respective ranges to all the particle number. As shown in FIG. 1, the average particle size of the platinum particles supported on the catalyst was 17 Å, and the width of the particle distribution was narrow as shown in FIG. 1.

Example 2

A carbon catalyst supporting platinum and palladium in the molar ratio of 1:1 (the total mole was the same as that of the platinum of Example 1) was prepared in accordance with the following procedures.

To an aqueous solution which had been prepared by diluting 6.25 ml of an aqueous solution of chloroplatinic acid (platinum concentration was 200 g/liter) and 3.4 ml of an aqueous solution of palladium chloride (palladium concentration was 200 g/liter) with 1 liter of pure water, 10 g of carbon powder was added and sufficiently dispersed by means of an ultrasonic homogenizer. While carbon monoxide was blown into the solution at the rate of 100 ml/min., the platinum and rhodium ions were reduced by adding a solution which had been prepared by dissolving 0.88 g of hydrazine hydrate into 100 ml of pure water, followed by the stirring for 16 hours.

Figure 3:
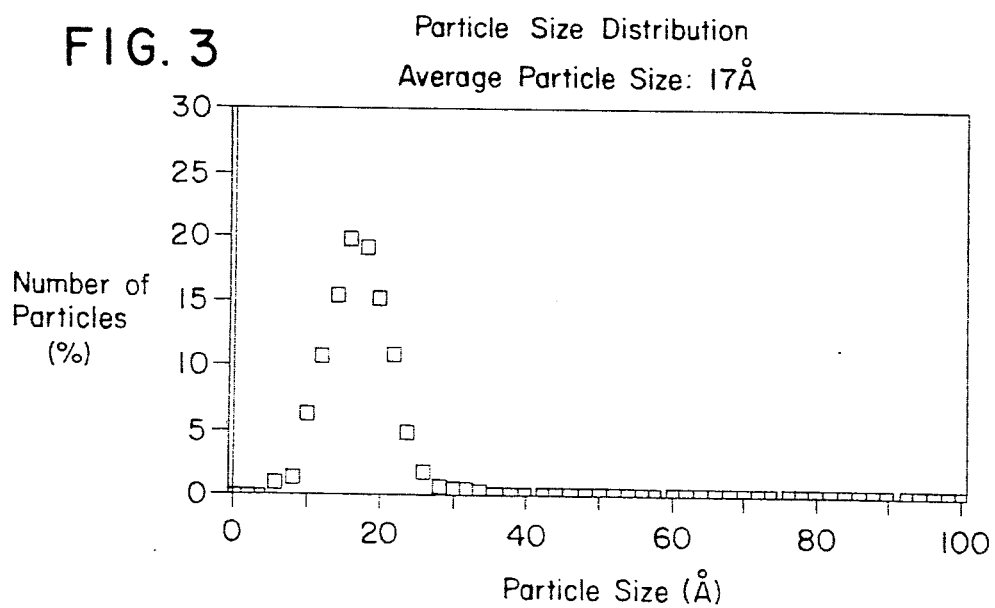
FIG. 3 is a graph showing the particle size distribution of the carbon catalyst supporting the platinum and the palladium obtained in Example 2.
Figure 4:
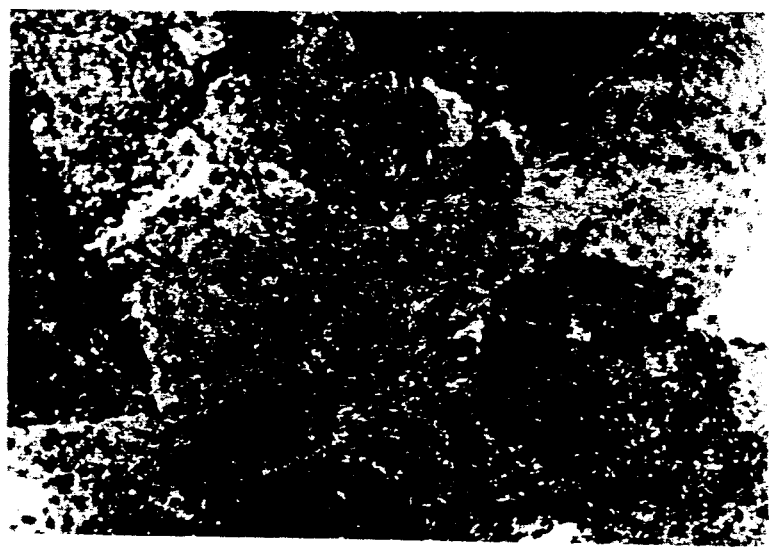
FIG. 4 is a microphotograph of 1,000,000 times of the carbon catalyst supporting the platinum and the palladium obtained in Example 2.

Thereafter, the same procedures as those of Example 1 were conducted to obtain a carbon catalyst supporting the platinum and the palladium. The overall amount of the supported platinum and palladium of the platinum-palladium-supported carbon support obtained was 16% in weight. The particle size and the particle size distribution of the metal particles of this catalyst were measured by means of X-ray diffraction, and the catalyst was observed by means of an electron microscope. The particle size distribution and a microphotograph of 1,000,000 times are shown in FIGS. 3 and 4, respectively. As shown in FIG. 3, the average particle size of the platinum-palladium particles supported on the catalyst was 20 Å, and the width of the particle distribution was narrow as shown in FIG. 3.

Example 3

To 1 liter of a nitric acid solution of dinitrodiaminoplatinum containing 2.5 g of platinum, 10 g of carbon powder was added and sufficiently dispersed by means of an ultrasonic homogenizer. While carbon monoxide was blown into the solution at the rate of 100 ml/min., the platinum ion was reduced by adding a solution which had been prepared by dissolving 5.19 g of L-ascorbic acid into 100 ml of pure water, followed by the stirring for 16 hours.

Figure 5:
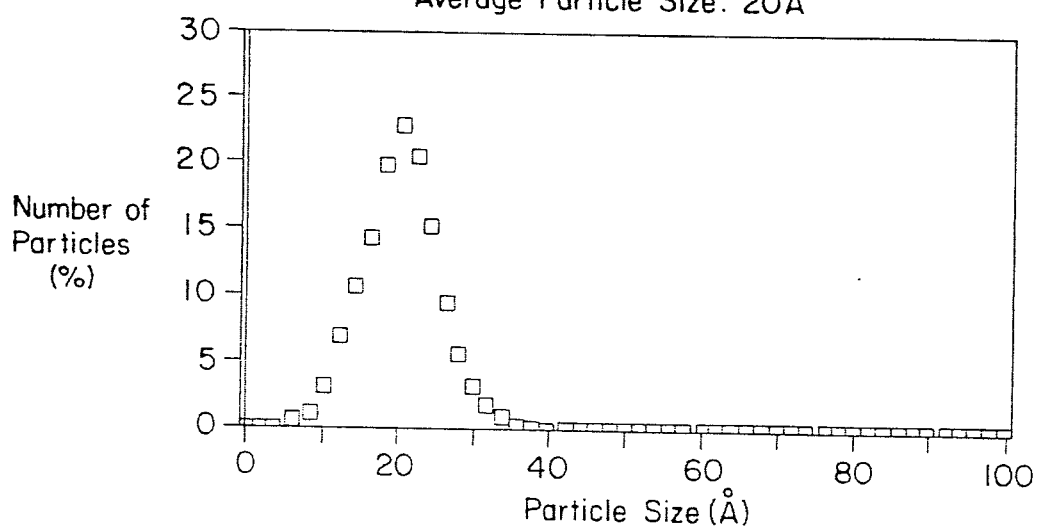
FIG. 5 is a graph showing the particle size distribution of the carbon catalyst supporting the platinum obtained in Example 3.
Figure 6:
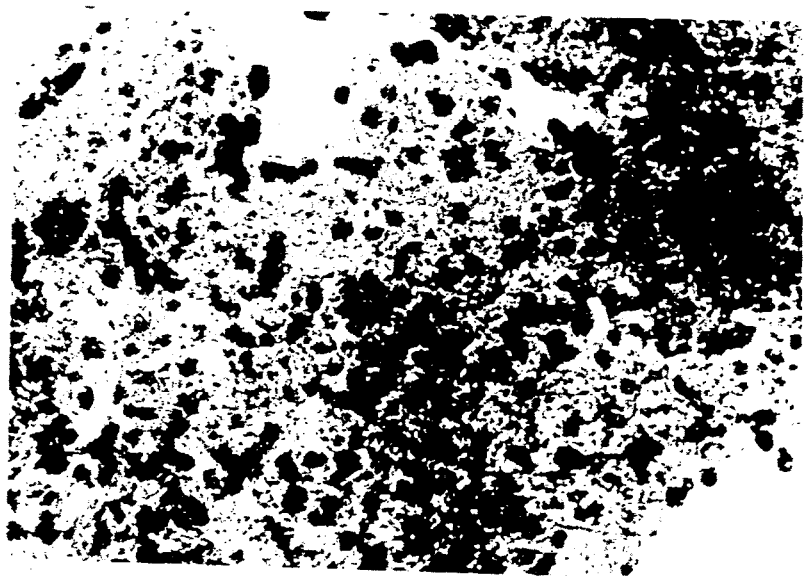
FIG. 6 is a microphotograph of 1,000,000 times of the carbon catalyst supporting the platinum obtained in Example 3.

Thereafter, the same procedures as those of Example 1 were conducted to obtain a carbon catalyst supporting the platinum. The particle size and the particle size distribution of the metal particles of this catalyst were measured by means of X-ray diffraction, and the catalyst was observed by means of an electron microscope. The particle size distribution and a microphotograph of 1,000,000 times are shown in FIGS. 5 and 6, respectively. As shown in FIG. 5, the average particle size of the platinum particles supported on the catalyst was 20 Å, and the width of the particle distribution was narrow as shown in FIG. 5.

Example 4

A carbon catalyst supporting platinum and ruthenium in the molar ratio of 1:1 (the total mole was the same as that of the platinum of Example 1) was prepared in accordance with the following procedures.

The catalyst supporting the platinum-ruthenium particles was prepared according to the same procedures as those of Example 2 except that 3.24 ml of of an aqueous solution of ruthenium chloride (ruthenium concentration was 200 g/liter) was employed in place of an aqueous solution of palladium chloride (palladium concentration was 200 g/liter). The particle size and the particle size distribution of the metal particles of this catalyst were measured by means of X-ray diffraction, and the catalyst was observed by means of an electron microscope. The average particle size of the platinum-ruthenium particles supported on the catalyst was 17 Å, and the width of the particle distribution was narrow as the catalyst of Example 2.

Example 5

A catalyst supporting platinum particles was prepared according to the same procedures as those of Example 1 except that powdery active alumina was employed as a support in place of the carbon powder. The particle size and the particle size distribution of the metal particles of this catalyst were measured by means of X-ray diffraction, and the catalyst was observed by means of an electron microscope. The average particle size of the platinum particles supported on the catalyst was 17 Å, and the width of the particle distribution was narrow as the catalyst of Example 1.

Comparative Example 1

Figure 7:
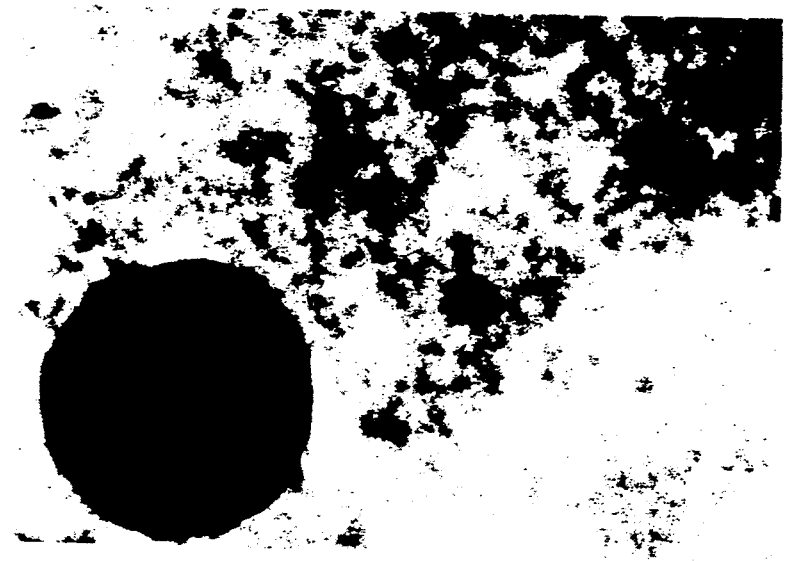
FIG. 7 is a graph showing the particle size distribution of the carbon catalyst supporting the platinum and the palladium obtained in Comparative Example 1.

A catalyst supporting platinum particles was prepared according to the same procedures as those of Example 1 except that the procedure of bubbling the carbon monoxide was excluded. The particle size and the particle size distribution of the metal particles of this catalyst were measured by means of X-ray diffraction, and the catalyst was observed by means of an electron microscope. A microphotograph of 1,000,000 times is shown in FIG. 7. The average particle size of the platinum particles supported on the catalyst was 46 Å, but the platinum particles agglomerated with each other to become a particle of not less than 0.1 μm.

Comparative Example 2

Figure 8:
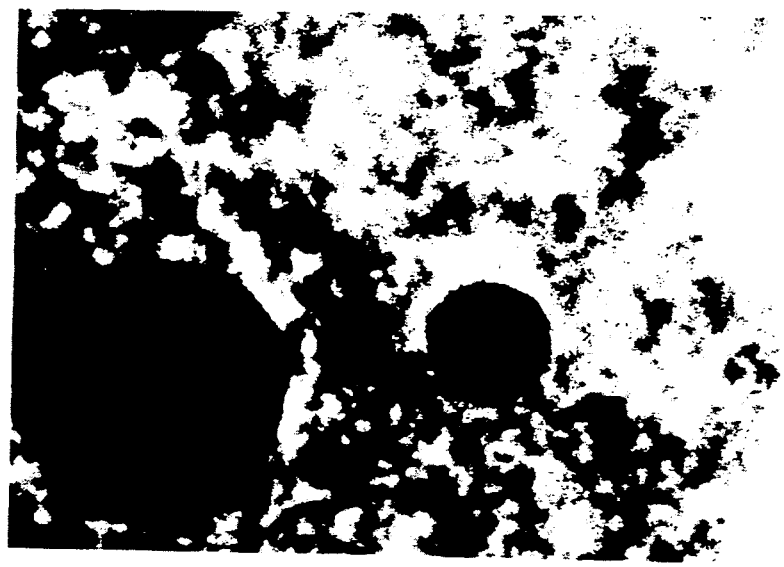
FIG. 8 is a microphotograph of 1,000,000 times of the carbon catalyst supporting the platinum and the palladium obtained in Comparative Example 2.

A catalyst supporting platinum and palladium particles was prepared according to the same procedures as those of Example 2 except that the procedure of bubbling the carbon monoxide was excluded. The particle size and the particle size distribution of the metal particles of this catalyst were measured by means of X-ray diffraction, and the catalyst was observed by means of an electron microscope. A microphotograph of 1,000,000 times is shown in FIG. 8. The average particle size of the platinum-palladium particles supported on the catalyst was 48 Å, but the particles agglomerated with each other to become a particle of not less than 0.1 μm.

Comparative Example 3

Figure 9:
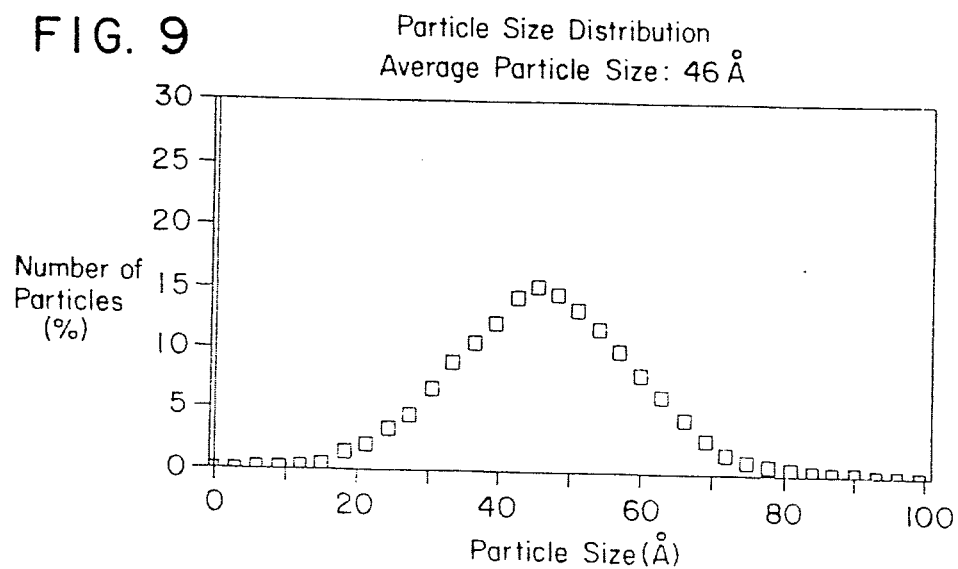
FIG. 9 is a graph showing the particle size distribution of the carbon catalyst supporting the platinum obtained in Comparative Example 3.
Figure 10:
FIG. 10 is a microphotograph of 1,000,000 times of the carbon catalyst supporting the platinum obtained in Comparative Example 3.

A catalyst supporting platinum particles was prepared according to the same procedures as those of Example 3 except that the procedure of bubbling the carbon monoxide was excluded. The particle size and the particle size distribution of the metal particles of this catalyst were measured by means of X-ray diffraction, and the catalyst was observed by means of an electron microscope. Particle size distribution and a microphotograph of 1,000,000 times are shown in FIG. 9 and 10, respectively. The average particle size of the platinum particles supported on the catalyst was 46 Å.

Comparative Example 4

A catalyst supporting platinum and ruthenium particles was prepared according to the same procedures as those of Example 4 except that the procedure of bubbling the carbon monoxide was excluded. The particle size and the particle size distribution of the metal particles of this catalyst were measured by means of X-ray diffraction, and the catalyst was observed by means of an electron microscope. The average particle size of the platinum-ruthenium particles supported on the catalyst was 52 Å, and the particles agglomerated with each other to lower the degree of dispersion as Comparative Examples 1 and 2.

Comparative Example 5

A catalyst supporting platinum particles was prepared according to the same procedures as those of Example 5 except that the procedure of bubbling the carbon monoxide was excluded. The particle size and the particle size distribution of the metal particles of this catalyst were measured by means of X-ray diffraction, and the catalyst was observed by means of an electron microscope. The average particle size of the platinum particles supported on the catalyst was 57 Å, and the particles agglomerated with each other to lower the degree of dispersion as Comparative Examples 1, 2 and 4.

Prior Art Example 1

Figure 11:
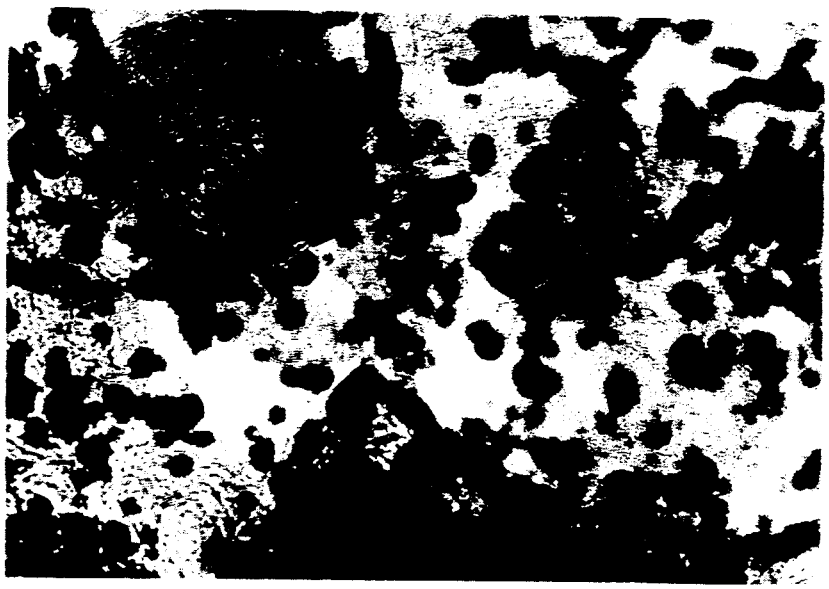
FIG. 11 is a microphotograph of 1,000,000 times of the carbon catalyst supporting the platinum obtained in Prior Art Example 1.

To 1 liter of an aqueous solution of chloroplatinic acid containing 2.5 g of platinum, 10 g of carbon powder was added and sufficiently dispersed by means of an ultrasonic homogenizer. To this solution, 5 g of polyvinyl alcohol was added as protective colloid, and then the platinum ion was reduced by adding 1 liter of methanol and keeping the solution temperature at 70° C. for 6 hours. After the platinum catalyst was prepared according to the above process, the catalyst was filtered and repeatedly washed with pure water until the pH of the filtrate became 7. The protective colloid was removed by the treatment in an inert gas atmosphere at 300° C. for 2 hours (Japanese patent publication No. 63-40135). The particle size and the particle size distribution of the metal particles of this catalyst were measured by means of X-ray diffraction, and the catalyst was observed by means of an electron microscope. A microphotograph of 1,000,000 times of this catalyst is shown in FIG. 11. Although the average particle size of the platinum particles supported on the catalyst was 30 Å, a cluster was formed by every several particles.

What is claimed is:

1. A process of preparing a catalyst supporting highly dispersed metal particles having an average particle size of not more than 20 Å comprising, in the presence of carbon monoxide in a solution containing a metal-containing ion and a support on which metal particles produced by reduction of the metal-containing ion are supported, reducing by means of a reductant the metal-containing ion to the corresponding metal particles which are then supported on the support.

2. The process as claimed in claim 1, wherein the metal of the metal-containing ion is selected from the group consisting of palladium, rhodium, ruthenium, iridium and platinum.

3. The process as claimed in claim 1, wherein the reductant is selected from the group consisting of hydrazine hydrochloride, hydrazine sulfate, sodium borohydride, ethanol, methanol, hydrazine hydrate and L-ascorbic acid.

* * * * *